July 9, 1935.  A. MARCHEV ET AL  2,007,473
DUPLICATING MACHINE
Filed March 29, 1933  10 Sheets-Sheet 1
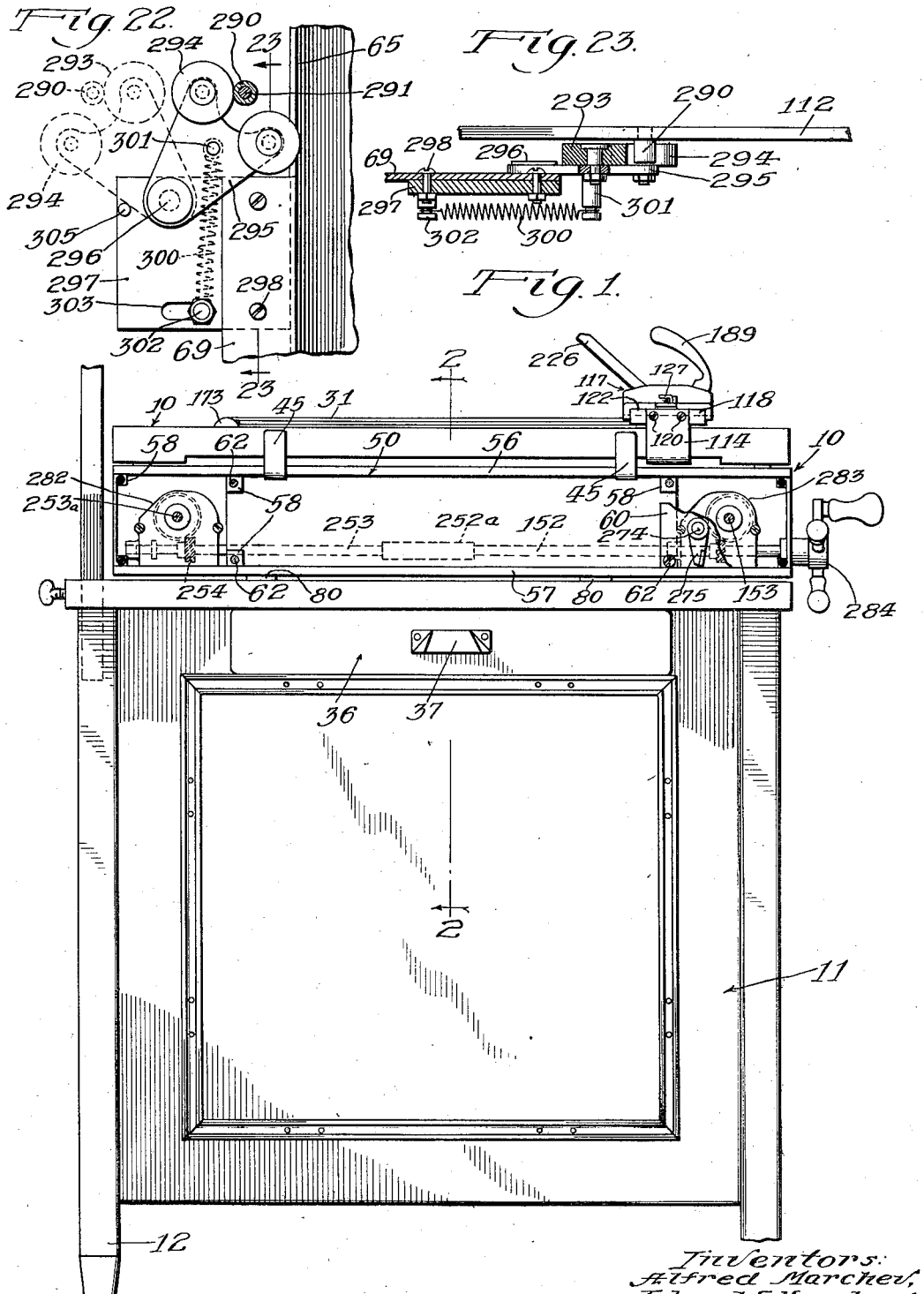

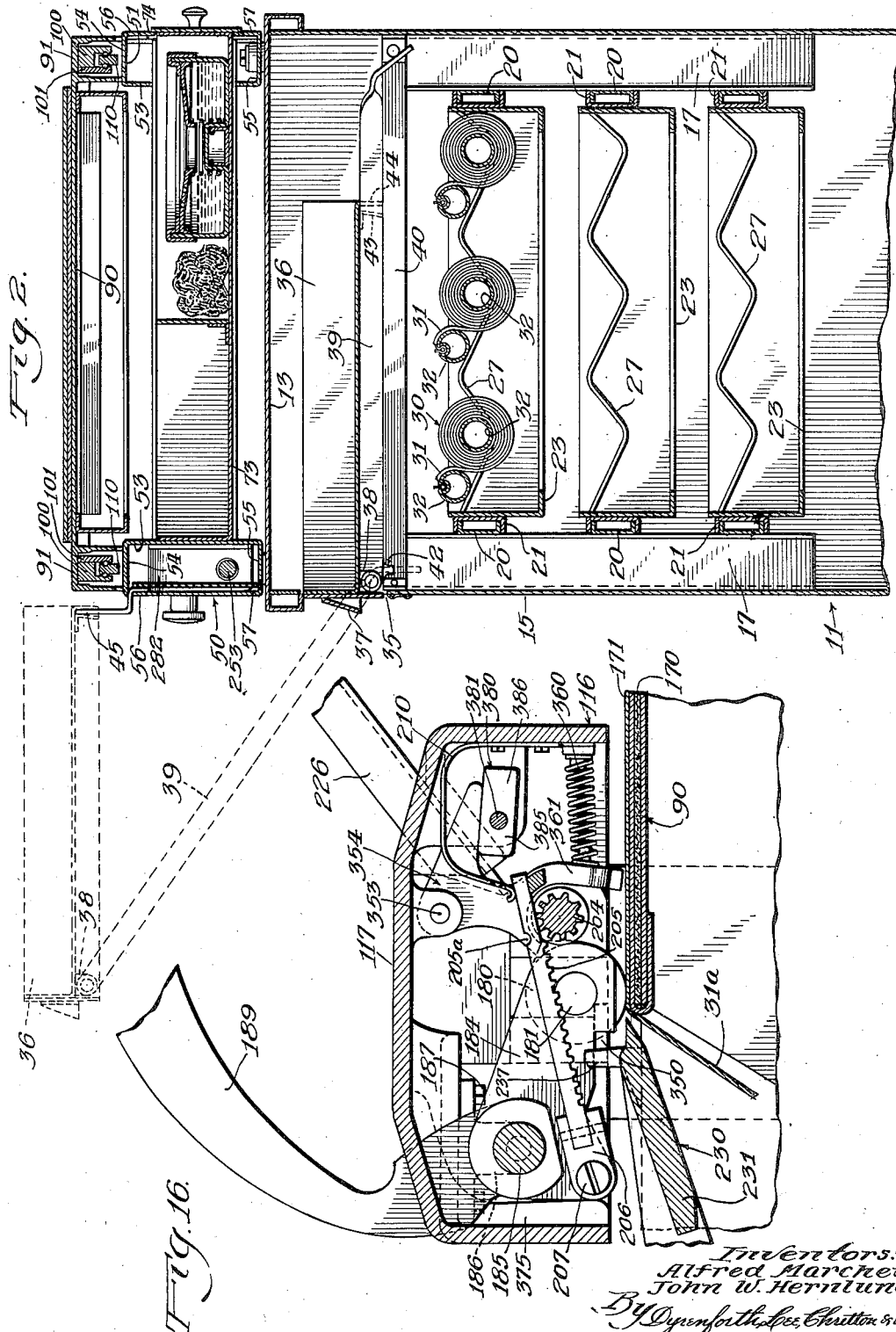

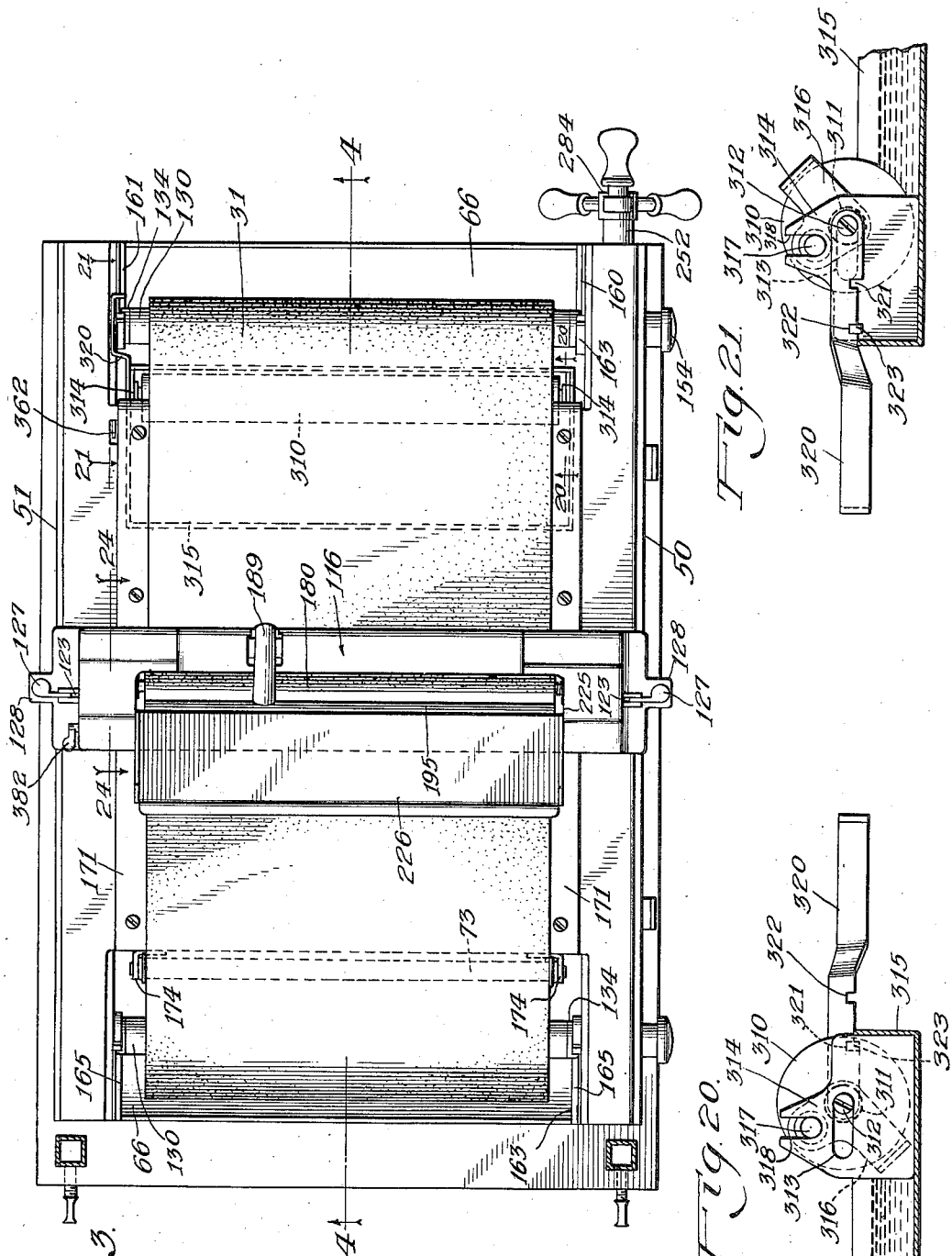

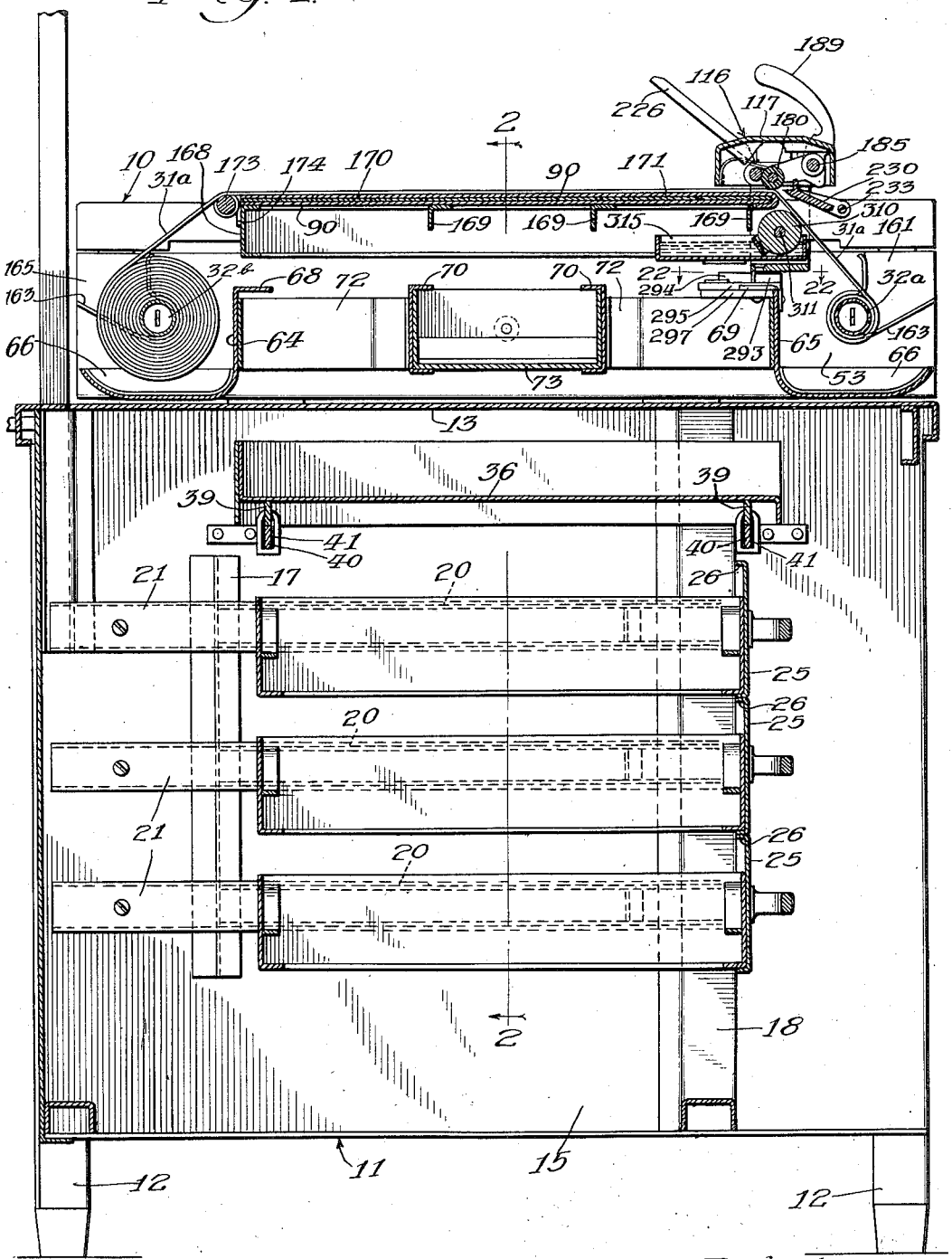

July 9, 1935.  A. MARCHEV ET AL  2,007,473
DUPLICATING MACHINE
Filed March 29, 1933  10 Sheets-Sheet 5
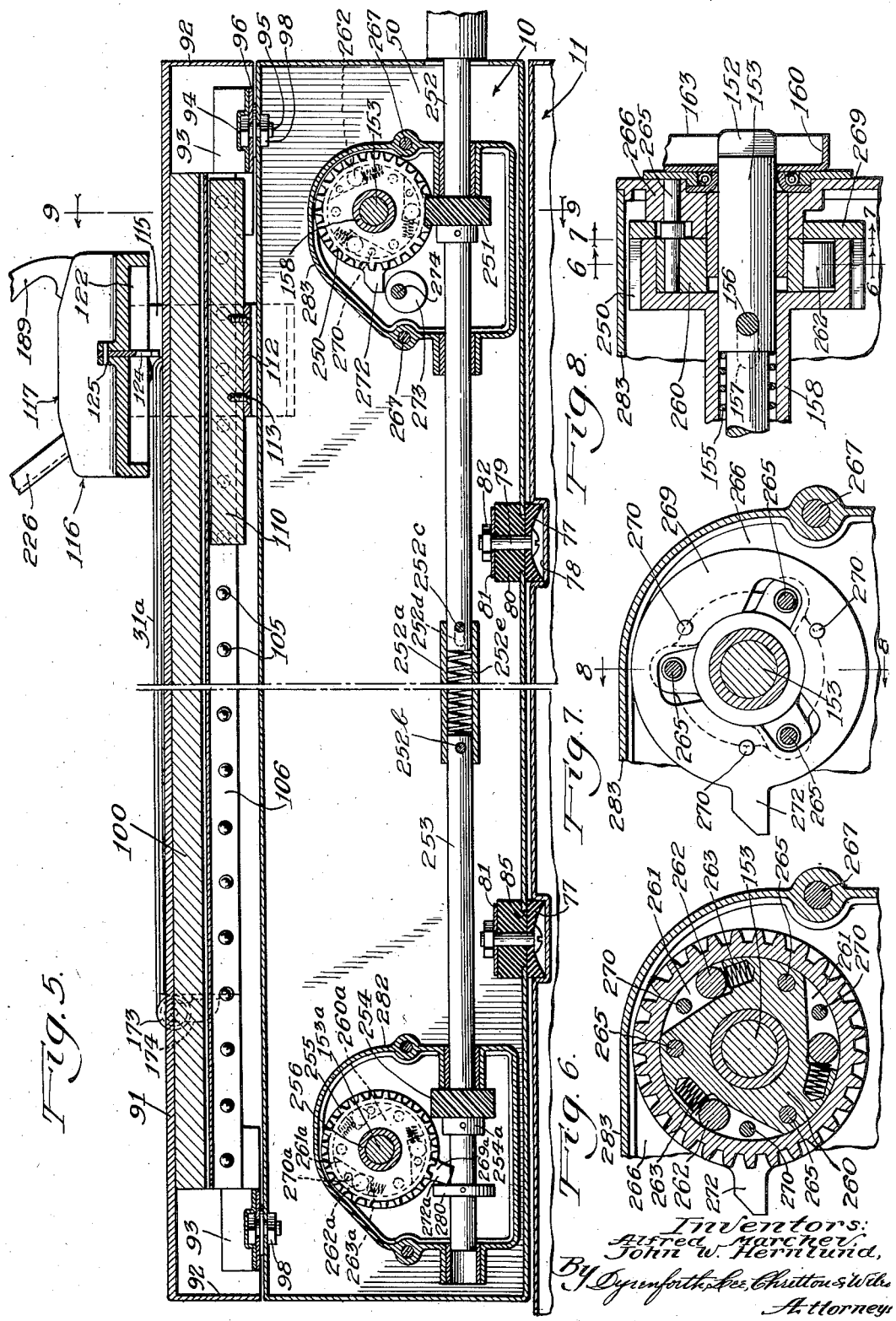

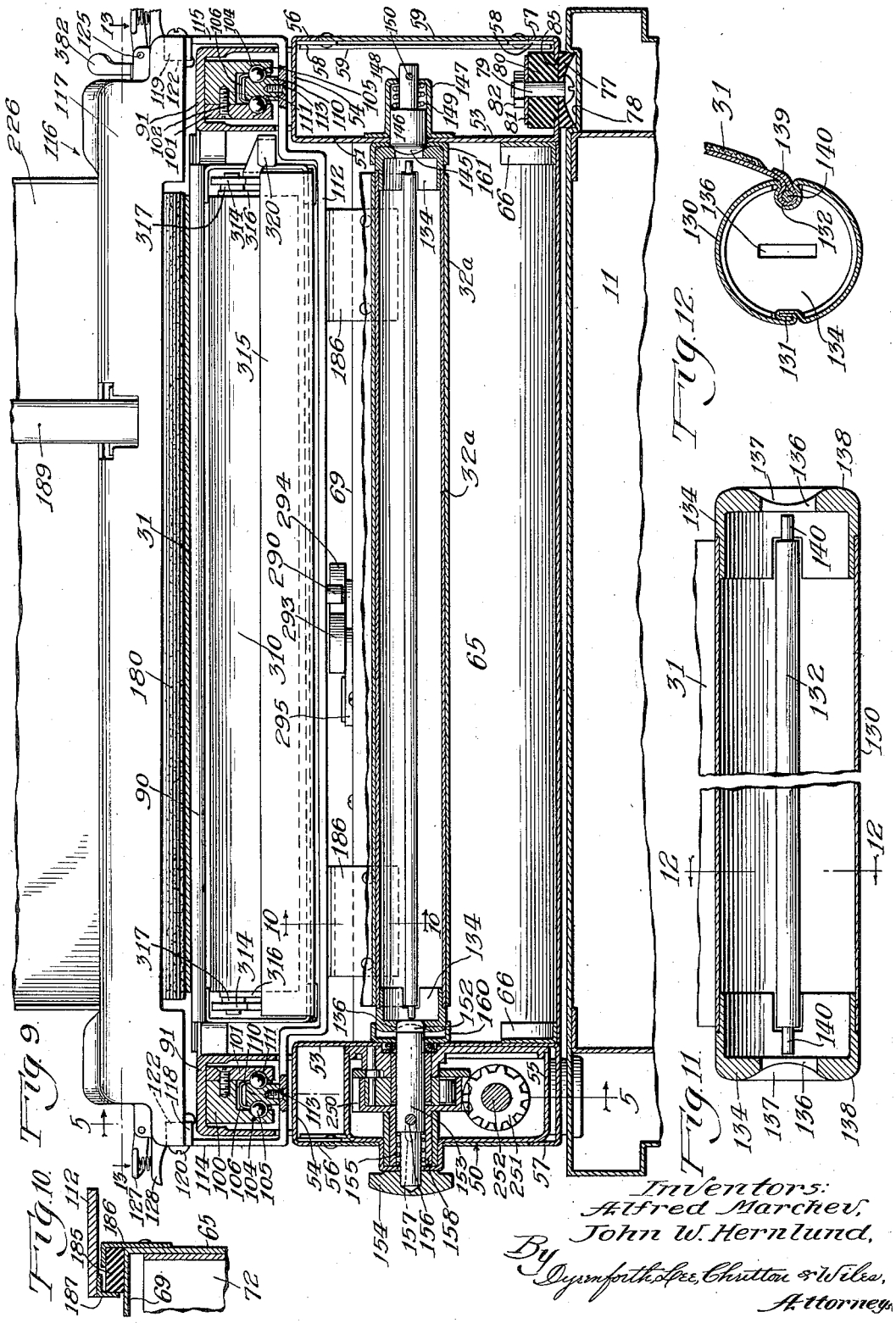

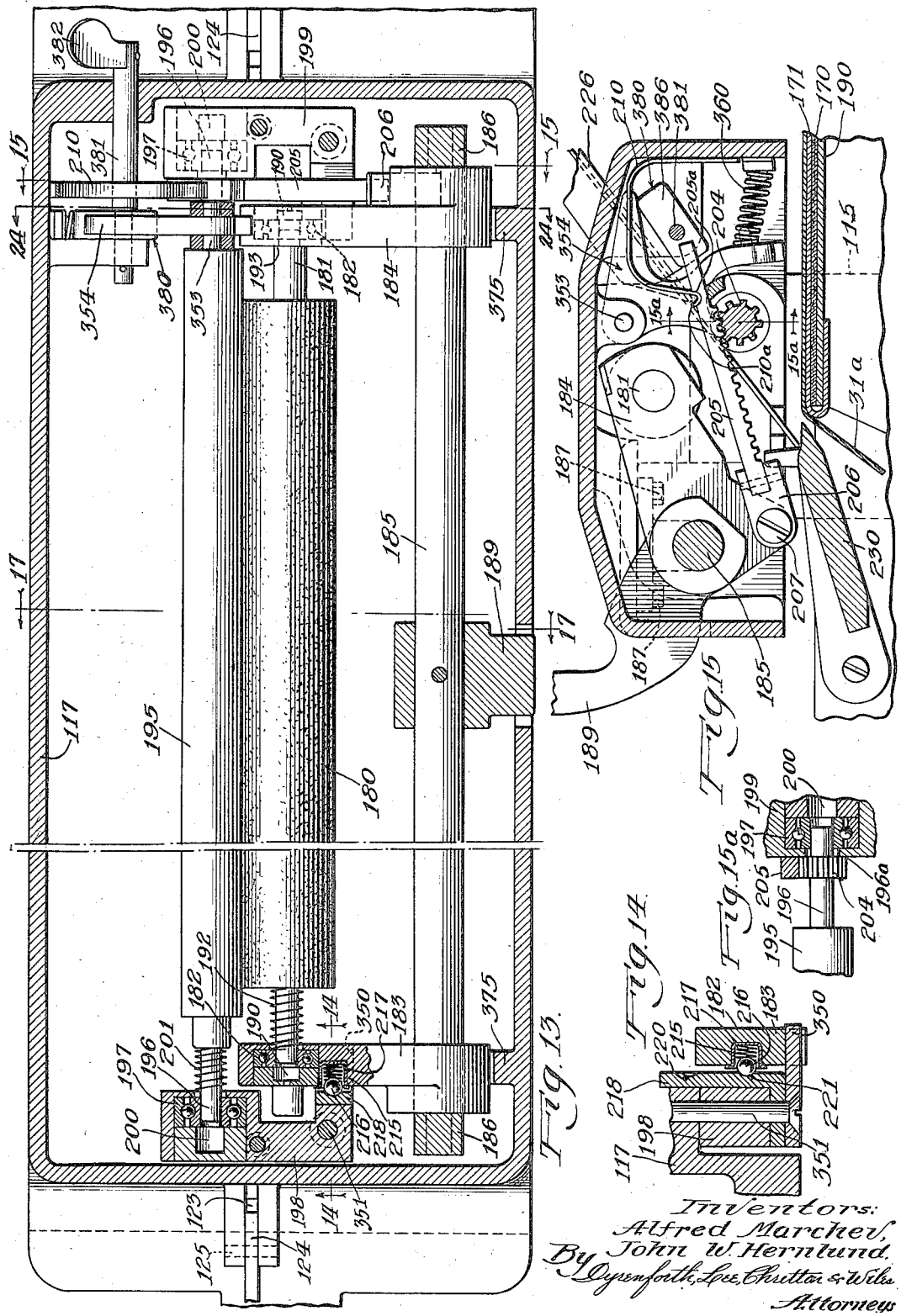

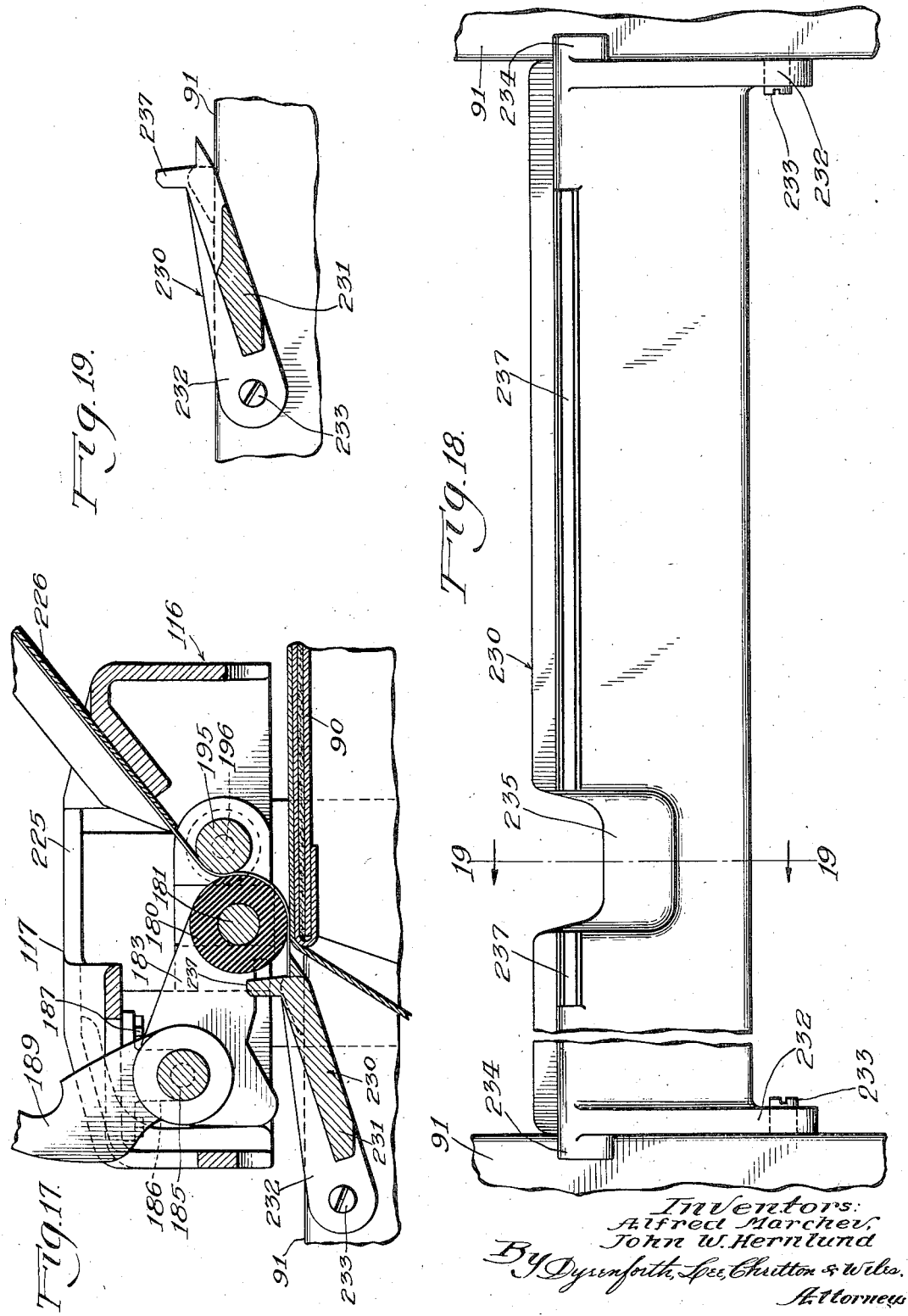

July 9, 1935.    A. MARCHEV ET AL    2,007,473
DUPLICATING MACHINE
Filed March 29, 1933    10 Sheets-Sheet 9
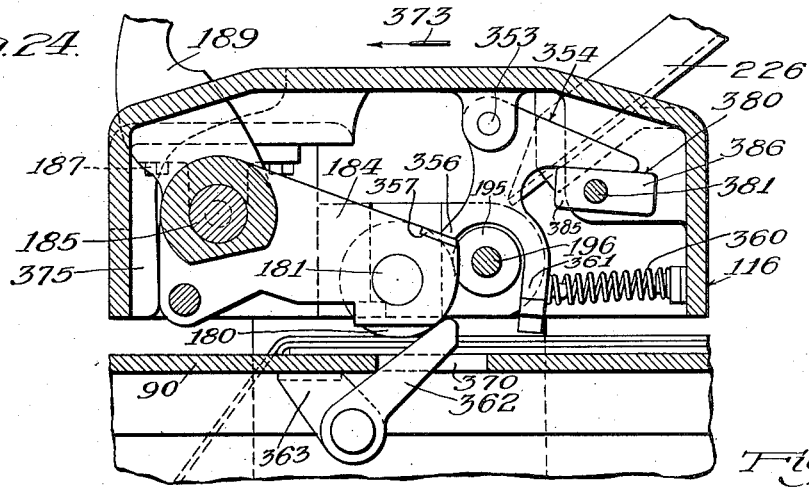
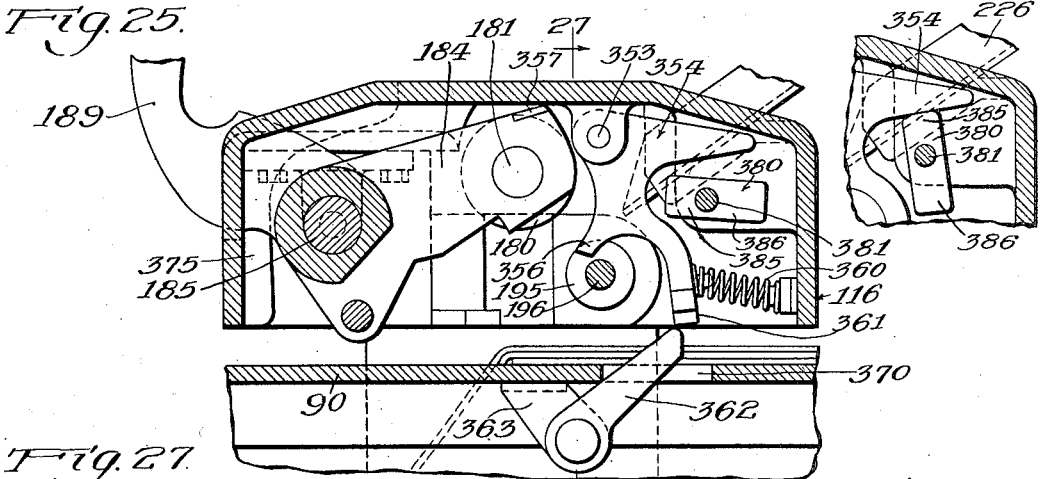
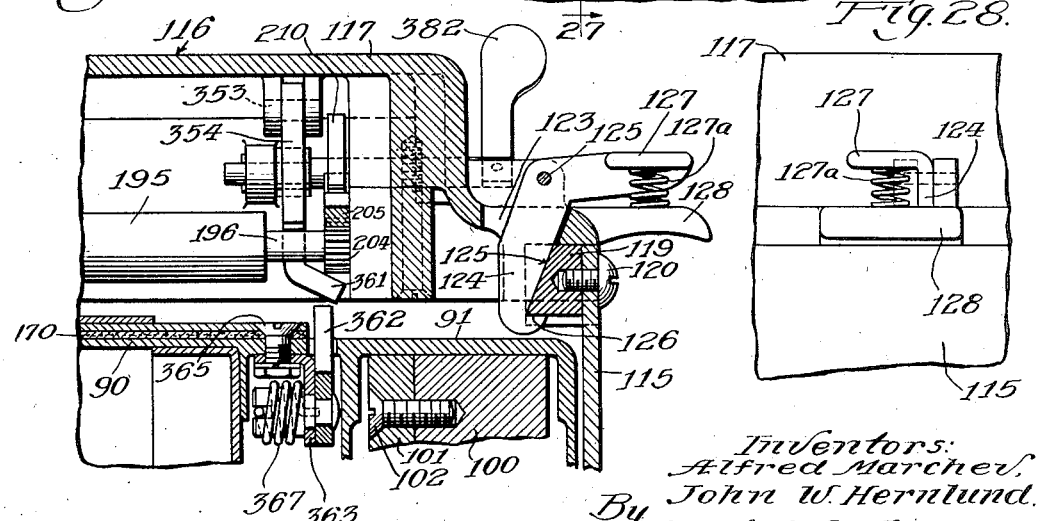
Inventors:
Alfred Marchev,
John W. Hernlund.
By Dyrenforth, Lee, Chritton & Wiles
Attorneys.

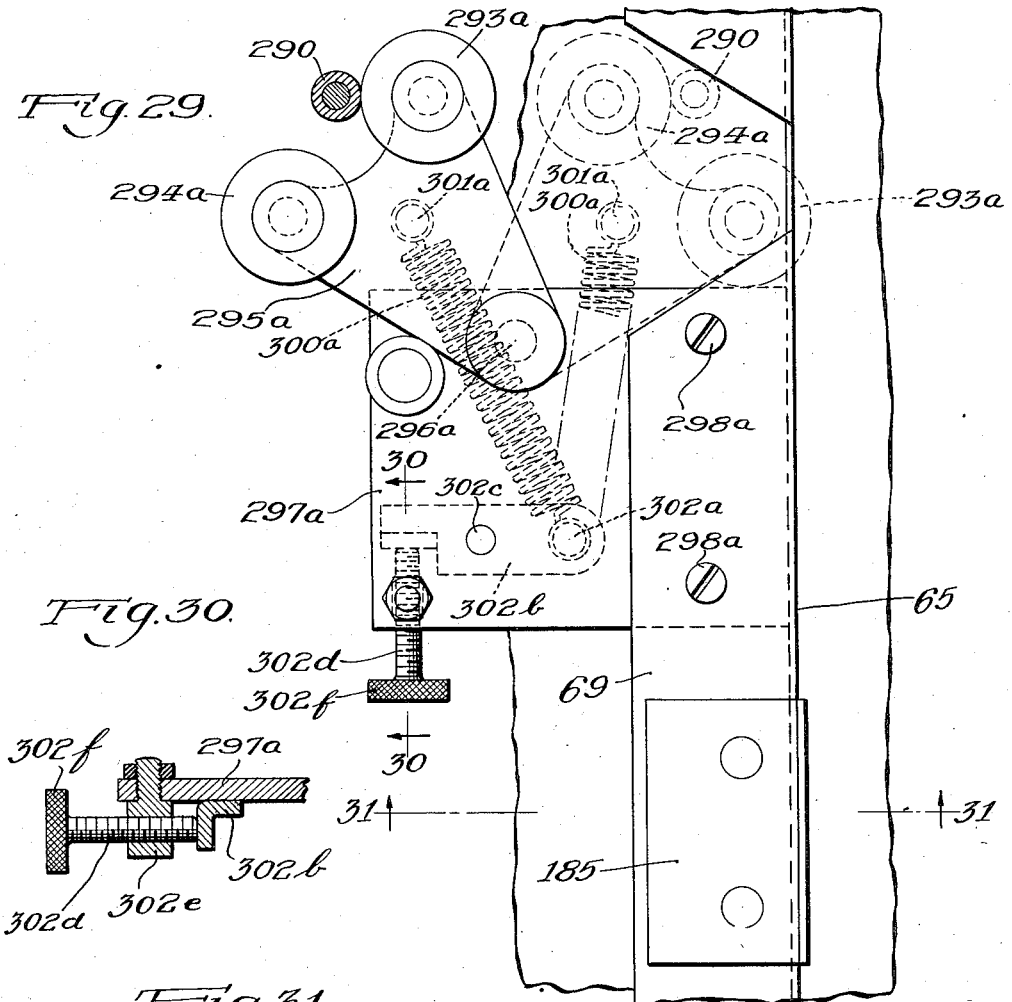

Patented July 9, 1935

2,007,473

UNITED STATES PATENT OFFICE 2,007,473

DUPLICATING MACHINE

Alfred Marchev and John W. Hernlund, La Grange, Ill., assignors to Ditto Incorporated, a corporation of West Virginia Application March 29, 1933, Serial No. 663,404

28 Claims. (Cl. 101—133)

The invention relates to duplicating machines and is particularly adapted to be embodied in duplicating machines of the hectograph type.

The primary object of the invention is to provide a duplicating machine which will be simple and compact in construction, durable, efficient and adapted to be operated rapidly.

One form of the invention is embodied in a hectograph machine of the flat bed type. The machine comprises a cabinet of improved construction for holding a supply of duplicating or gelatine bands, the cabinet being adapted to support the duplicating apparatus at a convenient height. The cabinet comprises a tray which may be withdrawn therefrom and brought into a position adjacent the platen of the duplicating apparatus so that sheets to be duplicated or duplicated sheets may be piled thereon. The duplicating apparatus comprises an improved frame secured to the cabinet by yielding means which assists in making the operation of the machine relatively noiseless. The platen of the duplicating apparatus is of improved construction and preferably comprises a layer of felt or other yielding material held between two platen members, the upper of which is the platen member over which the gelatin band in use, is disposed. A carriage is slidably mounted in the frame so that it may be reciprocated over the platen bed. The means for mounting the carriage for sliding movement preferably comprises the improved anti-friction means. The carriage is provided with platen and pressure rollers adapted to feed the sheets to be duplicated to the gelatin band and to strip them therefrom. Improved means is provided for controlling the platen and pressure rollers.

The platen rollers is preferably formed of material more yielding than the gelatin coating of the gelatin bands and it is preferably controlled so that all parts of a sheet being duplicated will be subjected to like pressure. This insures neat and legible copies.

The machine preferably comprises improved means for moistening the gelatin bands and, also, spindles of improved construction to which the ends of the gelatin bands are secured. Improved means is provided for winding and rewinding the gelatin bands upon the spindles.

Another feature of the machine is the provision of a margin bar of improved construction.

Other objects and advantages will become apparent as the following detailed description progresses, reference being had to the accompanying drawings, wherein—

Figure 1 is a side elevation of a duplicating machine which embodies the invention.

Figure 2 is a section taken on line 2—2 of Fig. 1.

Figure 3 is a plan view of the improved machine.

Figure 4 is a section taken on line 4—4 of Fig. 3.

Figure 5 is a section taken on line 5—5 of Fig. 9.

Figure 6 is a section taken on line 6—6 of Fig. 8.

Figure 7 is a section taken on line 7—7 of Fig. 8.

Figure 8 is a section taken on line 8—8 of Fig. 7.

Figure 9 is a section taken on line 9—9 of Fig. 5.

Figure 10 is a section taken on line 10—10 of Fig. 9.

Figure 11 is a central longitudinal section taken through one of a pair of spindles which form parts of the improved machine.

Figure 12 is a section taken on line 12—12 of Fig. 11.

Figure 13 is a section taken on line 13—13 of Fig. 9.

Figure 14 is a section taken on line 14—14 of Fig. 13.

Figure 15 is a section taken on line 15—15 of Fig. 13.

Figure 15a is a section taken on line 15a—15a of Fig. 15.

Figure 16 is a section taken on the same line as Figure 15, but it shows some of the parts of the machine in changed positions.

Figure 17 is a section taken on line 17—17 of Figure 13.

Figure 18 is a plan view of a margin bar forming part of the improved machine.

Figure 19 is a section taken on line 19—19 of Fig. 18.

Figure 20 is a section taken on line 20—20 of Fig. 3.

Figure 21 is a section taken on line 21—21 of Fig. 3.

Figure 22 is a section taken on line 22—22 of Fig. 4.

Figure 23 is a section taken on line 23—23 of Fig. 22.

Figure 24 is an enlarged section taken through a carriage which forms part of the improved duplicating machine, the section being taken through the carriage on line 24—24 of Fig. 13 and the carriage being shown in a changed position with respect to the platen of the duplicating machine.

Figure 25 is a section taken on the same line as Fig. 24, but mechanism associated with the carriage is illustrated in changed positions.

Figure 26 is a fragmentary section taken on the same line as Fig. 24, but certain mechanism carried by the carriage is shown in a changed position.

Figure 27 is a section taken on line 27—27 of Fig. 25.

Figure 28 is a fragmentary side elevation of the mechanism shown in Fig. 27.

Figure 29 is a plan view of mechanism which embodies another form of the invention, and may be employed in place of the mechanism shown in Figs. 22 and 23.

Figure 30 is a section taken on line 30—30 of Fig. 29, and

Figure 31 is a section taken on line 31—31 of Fig. 29.

Referring to the drawings wherein a preferred embodiment of the invention is illustrated, the reference character 10 designates the improved duplicating apparatus which is mounted upon a cabinet 11.

The cabinet 11 is preferably formed from sheet metal and preferably comprises legs 12, a top wall 13, a back wall 14 and side walls 15. Secured to the inner surfaces of the side walls 15 are vertically disposed Z-shaped members 17 and vertically disposed U-shaped members 18. A plurality of horizontally disposed channel members 20 are spot-welded or otherwise secured to the members 17 and 18 (see Fig. 2). Slidably mounted upon the channel members 20 are channel members 21 which are attached to drawers 23. The drawers 23 are provided with front plates 25 having rearwardly extending flanges 26 at the peripheries thereof. It will be noted that the cabinet is not provided with a front wall and that the front plates 25 have the appearance of a front wall when the drawers 23 are in their closed positions.

A bent bar 27 of zig-zag form is fixed in each end of each of the drawers 23. The bent bars 27 are adapted to hold a plurality of gelatin band rolls which are designated generally by the reference character 30. Each roll comprises a gelatin band 31 and spindles 32 to which the ends of the bands are secured. (See Fig. 2.) Each of the bands is wound around one of the spindles 32 and the ends of the spindle rest upon the associated bent bars 27. The spindles attached to the outer end of the band also rest upon the bent bars 27. The construction is such that the gelatin band rolls 30 are held in spaced relation in the drawers 23.

One of the side walls 15 is apertured as at 35 to receive a tray 36 provided with a handle 37. The tray 36 is provided at its front end with downwardly extending bracket members 38 which are pivoted to bars 39. The bars 39 rest upon bars 40 when the tray is disposed within the cabinet 11. (See Fig. 2.) The bars 40 are rigidly secured to the side walls 15. The free end of each bar 39 is slotted as at 41 to receive the bars 40. (Figs. 2 and 4.) This construction permits the bars 39 to be displaced from the positions wherein they are shown in full lines in Fig. 2 to the position wherein they are shown in dotted lines. When the bars 39 are in the latter position, they engage notches 42 formed in the bars 40. The tray 36 is provided with downwardly extending spaced lugs 43 and 44 engageable with bracket members 45 projecting from the frame of the duplicating apparatus 10. When the bars 39 engage the slots 42 and the lugs 43 and 44 engage the bracket members 45 as shown in dotted lines in Fig. 2, the tray 36 is secured rigidly in its position adjacent the duplicating apparatus. The sheets to be duplicated or the duplicated sheets may be placed thereon.

The frame of the duplicating apparatus 10 comprises side frame members 50 and 51 which are preferably formed from sheet metal. Each of the side frames 50 and 51 is hollow and comprises an inner longitudinal wall 53, an upper wall 54 and a bottom wall 55. The outer edges of the top and bottom walls 54 and 55 are provided with flanges 56 and 57 which extend toward each other. (See Figs. 1, 2 and 9.) Lugs 58 are welded or otherwise secured to the inner surfaces of the flanges 56 and 57. (See Figs. 1 and 9.) Secured to the inner surfaces of four of the lugs 58 in each of the side frame members 50 and 51 is a plate 59. (Fig. 1.) The plates 59 co-operate with similar plates to form the outer walls of the side frame members 50 and 51, a fragment of one of these plates being shown at 60 in Fig. 1. The plates 60 are disposed at the ends of the side frame members, the plates 59 being disposed between the plates 60. The plates 59 and 60 are secured to the lugs 58 by screws 62, the construction being such that the plates 60 may be removed with little effort when it is necessary to gain access to mechanism disposed within the side frame members.

The frame of the duplicating apparatus 10 also comprises bent sheet metal members 64 and 65 at the back and front ends, respectively, of the frame. Bracket members 66 welded to the ends of the members 64 and 65 are welded to the inner walls 53 of the side frame members 50 and 51. The members 64 and 65 are provided with flanges 68 and 69 which extend toward each other. (Fig. 4.)

A pair of channel members 70, which extend between the side frame members 50 and 51 are secured to the members 64 and 65 by bent sheet metal members 72. The channel members 70 form slides for a drawer 73 which may be pulled out through an aperture 74 formed in the plate 59 of the side frame member 51. The drawer may be employed to hold moistening materials or any other apparatus which is to be used in connection with the duplicating mechanism.

As best illustrated in Fig. 9, each of the side frame members 50 and 51 is provided with a plurality of resilient means for supporting it on the top wall 13 of the cabinet 11. Each of these resilient means comprises a rubber washer 77, or the equivalent, secured to the bottom surface of the associated bottom wall 55 and adapted to rest in a depression 78 formed in the top wall 13. The washer 77 is secured to the associated bottom wall 55 by means comprising a bolt 79, a rubber collar 80, a metallic washer 81 and a nut 82. A portion of the rubber collar 80 is reduced in diameter and extends through an aperture 85 in the associated bottom wall 55, so that it contacts the top surface of the associated rubber washer 77. The nut 82 and the bolt 79 secure the rubber washer 77 and the rubber collar 80 to each other and to the bottom wall 55. In this construction, there is no direct metallic connection between the duplicating apparatus 10 and the cabinet 11 and, therefore, any vibration set up in the duplicating apparatus will not be transmitted to any appreciable degree to the cabinet. This causes the device to operate with comparatively little noise.

It will be readily understood that the duplicating apparatus 10 may be lifted as a unit from the cabinet 11.

The duplicating apparatus 10 comprises a flat platen 90 which is preferably formed integral with channel members 91 extending longitudinally above the side frame members 50 and 51. (Figs. 2 and 5.)

The front and back ends of the channel members 91 are preferably closed by integral walls 92. The channel members are secured rigidly to the top walls 54 of the side frame members 50 and 51 by means comprising clips 93 which are welded to the channel members 91. Each clip 93 is provided with a polygonal recess 94 into which the head of a bolt 95 projects. The clips 93 are welded to plates 96 through which the bolts 95 also project, the construction being such that the heads of the bolts are secured rigidly to the plates 96 and the clips 93. The bolts project through the walls 54 and nuts 98, screw-threaded upon the bolts, engage the bottom surfaces of the walls 54.

Disposed within and rigidly secured to the channel members 91, are bars 100 to which bars 101 are secured by screws 102. (Fig. 9.) Each bar 100 and 101 is provided with a plurality of depressions 104 in which ball bearings 105 are journaled. The balls 105 are retained in the depressions 104 by retaining members 106. Disposed between each set of balls 105 is a bar 110 provided with raceways 111 for the balls 105. The bars 110 are secured to a bent bar 112 by screws 113. It will be noted that the bent bar 112 is suspended from the balls 105 through the medium of the bars 110 and that the bent bar 112 may be reciprocated longitudinally of the duplicating apparatus with very little effort as the balls 105 are anti-friction devices.

The bent bar 112 extends transversely of the duplicating apparatus and, at its outer ends, is provided with integral bars 114 and 115, the bars 114 and 115 being disposed above the side frame members 50 and 51, respectively. A carriage designated generally by the reference character 116, is mounted on and between the bars 114 and 115. The carriage 116 comprises a frame 117 disposed between and outwardly secured to horizontally extending bars 114 and 115, respectively, by screws 120. As best shown in Figs. 1, 5 and 9, the ends of the frame 117 are formed with elongated notches 122 in which the bars 118 and 119 fit snugly. The means for detachably securing the frame 117 to the bars 118 and 119 is illustrated in Figs. 1, 3, 5, 9, 27 and 28. It will be noted that each end of the frame 117 is provided with a slot 123 through which a dog 124 projects, the dogs 124 being pivoted to the frame 117 by pins 125. The bars 118 and 119 are slotted as at 125 to accommodate the dogs 124 so that notches 126 formed at the inner ends of the dogs 124 may engage the lower inner corners of the bars 118 and 119. (See Fig. 27.) The outer end of each dog 124 is provided with an integral finger piece 127 whereby the operator of the duplicating apparatus may displace the dog angularly to disengage it from its corresponding bar 118 or 119, this angular displacement being against the action of a spring 127a interposed between the finger piece 127 and a lug 128 projecting from the frame 117. Obviously, when both dogs 124 are disengaged from the bars 118 and 119, the carriage 116 and the mechanism mounted in it may be lifted as a unit from the duplicating apparatus and subsequently, may be returned and secured to the bars 118 and 119. This construction facilitates the task of replacing the gelatin band in the duplicating apparatus and also enables one to repair or clean the mechanism mounted in the carriage.

When the duplicating apparatus 10 is functionally operative, it is provided with two spindles, identical with the spindles 32 stored in the cabinet 11. For the purpose of this disclosure, the spindle at the front end of the duplicating apparatus is identified by the reference character 32a and the spindle at the back end of the machine is identified by the reference character 32b. The ends of a gelatin band 31a has its ends secured to the spindles 32a and 32b and has an intermediate portion drawn taut over the platen 90.

As illustrated in Figs. 9, 11 and 12, each of the spindles 32, 32a and 32b comprise a tubular member 130 which is preferably formed of sheet metal. The tubular member 130 is provided with a lock seam 131 extending longitudinally thereof and is also provided with a groove 132 formed by bending the metal of the tubular member inwardly as best shown in Fig. 12. The ends of the tubular member 130 are closed by hubs or caps 134 having inner ends of reduced diameter, which inner ends are welded or otherwise permanently secured to the tubular member. An elongated slot 136 is provided in each of the caps 134 and the outer end surfaces of the caps are provided with shallow concave depressions 137. The peripheries of the concave depressions 137 are defined by annular rounded surfaces 138 at the ends of the caps. It will be noted that the slots 136 are shorter in length than the diameters of the concave depressions 137. The gelatin band 31 or 31a, associated with the spindle, has one of its ends looped as at 139, the loop being positioned in the groove 132. A pin 140 extends through the loop in the gelatin band and secures the gelatin band to the tubular member. The ends of the pin 140 preferably extend beyond the groove 132 and into the caps 134 so that the pin cannot be removed unless one of the caps 134 is first removed. It will be readily understood that the pin 140 and the loop 139 must be assembled in the groove 132 before both of the caps 134 are secured to the tubular member 130. Substantially identical means are provided at the back and forward ends of the duplicating machine for detachably securing the spindles 32a and 32b therein. The means at the forward end of the machine is illustrated in Fig. 9 and a description of it will be sufficient for the purpose of this disclosure. Referring to Fig. 9, it will be noted that the right hand end of the spindle 32a is rotatably journaled on a convex surface 145 which is formed on a pin 146 slidably journaled in a cup shaped member 147 which is welded to the inner wall 53 of the side frame member 51. The outer end of the pin 146 is reduced in diameter and extends through an aperture 148 formed in the cup shaped member. A spring 149 disposed in the cup shaped member yieldingly urges the pin 146 to the left. (Fig. 9.) A pin 150 which extends through the smaller end of the pin 146, limits the distance the spring 149 may displace the pin 146 to the left. It will be noted that the convex surface 145 conforms to the curvature of the concave depression 137 at the left hand end of the spindle 32a and that only the rounded end 145 of the pin 146 is engageable by the spindle 32a.

The slot 136 in the left hand end (Fig. 9) of the spindle 32a fits snugly upon a polygonal lug or stem 152 formed integral with a pin 153 which is slidably mounted and is provided at its outer end with a knob 154, whereby it may be displaced manually to the left (Fig. 9) against the action of a spring 155. The spring 155 yieldingly urges the pin 153 to the right (Fig. 9.) Longitudinal displacement of the pin 153 in either direction is limited by a pin 156 which engages slots 157 provided in a hub member 158 disposed around the outer end of the pin 153.

When the spindle 32a is to be removed from the duplicating machine, the knob 154 is preferably displaced to the left (Fig. 9) against the action of the spring 155 to disengage the lug or stem 152 from the slot 136, whereupon the spindle may be withdrawn from the duplicating apparatus as the spring 149 will yield and permit the pin 146 to be displaced toward the right (Fig. 9). Another spindle 32 may then be positioned between the pins 146 and 153. It is not necessary that the slot 136 in the left hand end (Fig. 9) of the spindle be brought into registery with the lug or stem 152, as the end of the lug or stem 152 will center itself in the adjacent concave depression of the spindle and when the pin 153 is rotated subsequently, the spring 155 will displace the pin 153 to the right (Fig. 9) to engage the slot 136 when it comes into registery with the lug or stem. The pin 153 is driven by means hereinafter described to drive the spindle when the gelatin band is being advanced across the platen.

Secured to the inner walls 53 of the side frame members 50 and 51, are guide means 160 and 161 which, as illustrated in Figs. 4 and 9, assist the operator to guide the spindles 32 into the position wherein they are alined with the pins 146 and 153. The guide means 160 and 161 are preferably stamped from sheet metal and are provided with upstanding flanges 163. Each flange 163 is approximately V-shaped with a circular portion at the point of the V. Referring to Fig. 4, it will be obvious that when a heavy roll of gelatin band is to be inserted, it is a relatively easy matter to drop it into the V-shaped flanges 163 so that it will be guided into registery with the pins 146 and 153. Similar guiding means 165 are provided at the back of the machine.

The platen 90 is reenforced by a bent channel-shaped bar 168 which extends along the back edge thereof and also along the side edges thereof. (Fig. 4.) Intermediate the back and front ends of the platen, it is reenforced by angle members 169.

A layer of felt 170 is disposed between the upper surface of the platen 90 and the bottom surface of a platen member 171. The platen member 171 is preferably an aluminum plate and at its forward edge, is provided with a rearwardly extending flange 172 which engages the bottom surface of the platen 90. The gelatin band 31a rests upon the top surface of the platen member 171. The platen member 171 is secured to the platen 90 by screws 90a which pass through the felt 170. The felt 170 is employed to insure quiet operation of the machine.

An idler roll 173 is positioned adjacent the back end of the platen 90, the roll 173 being journaled in brackets 174 secured to the channel-shaped member 168. The roll 173 guides the gelatin band 31a from the spindle 32b to the upper surface of the platen member 171.

An impression or platen roller 180 is mounted in the carriage 116. The roller 180 is preferably formed from sponge rubber and it is preferably more yielding than the gelatin of the duplicating bands 31 and 31a. The roller 180 is mounted on a shaft 181 which has its ends journaled in ball bearings 182, the ball bearings 182 being mounted in the free ends of levers 183 and 184 fixed to a shaft 185. The ends of the shaft 185 are journaled in bearing blocks 186. Bolts 187 secure the bearing blocks 186 to the carriage frame 117. A handle 189, pinned to the shaft 185, may be oscillated to raise and lower the platen roller 180.

Openings 190 are provided in the levers 183 and 184 at the ends of the shaft 181 so that the shaft may be displaced longitudinally in either direction. A spring 192, disposed around the shaft 181, yieldingly urges the shaft to the right (Fig. 13) so that an annular shoulder 193, formed upon the shaft 181, normally abuts against the lever 184. This construction permits one to displace the shaft 181 toward the left (Fig. 13) against the action of the spring 192 until the right hand end of the shaft 181 is withdrawn from the lever 184, whereupon the shaft, with its platen roll 180, may be removed from the carriage and replaced.

A metallic pressure roller 195 co-operates with the platen roller 180 to feed sheets of paper to the duplicating surface. The roller 195 is provided with trunnions 196 which are journaled in ball bearings 197 mounted in brackets 198 and 199 secured to the carriage frame 117. Openings 200 are provided in the brackets 198 and 199 at the ends of the trunnions 196. A spring 201 yieldingly holds the roller 195 in a position wherein an annular shoulder 196a formed on one of the trunnions 196, abuts against the bracket 199. This construction is similar to that employed in connection with the shaft 181 and it will be understood that the roller 195 may be replaced at any time with little effort.

A pinion 204, formed integral with the roller 195, is adapted to mesh with the teeth of a rack bar 205. The rack bar 205 is fixed to a bifurcated member 206 pivoted on the lever 184 by a pin 207. (Fig. 16.) A leaf spring 210 secured to the carriage frame 117, yieldingly urges the rack bar 205 into engagement with the pinion 204. A lug 211 extending from the bracket 199 limits downward displacement of the free end of the rack bar 205.

The rack bar 205 is provided with a notch 205a which is engaged by the curved free end 210a of the leaf spring 210 when the platen roller 180 is in its uppermost position. The spring 210 serves to hold the platen roller yieldingly in its uppermost position.

A cup shaped member 215, disposed in the lever 183, houses a ball 216 which is urged yieldingly toward the bracket 198 by a spring 217. The ball 216 rides upon a steel plate 218 which is fixed to the bracket 198 and is provided with depressions 220 and 221 engageable by the ball 217. When the ball engages the depression 221, the platen roller 180 is in its lower-most position and is adapted to apply a sheet to be duplicated to the duplicating surface. When the ball 217 engages the depression 220, the platen roller 180 is in its upper-most position as illustrated in Fig. 15.

The carriage frame 117 is provided with an opening 225 into which the lower end of a feed table or tray 226 projects, the feed table being secured to the carriage frame.

As best shown in Figs. 13 and 14, downward movement of the platen roller 180 is limited by a stop plate 350 engageable by the lever 183 when the lever 183 is in its lowermost position. The stop plate 350 is secured to the bracket 198 by a screw 351 which also secures the plate 218 to the bracket 198.

Pivoted in the carriage frame 117 by a pin 353 is a latch member 354. The latch member 354 comprises a lug 356 engageable with a wear plate 357 fixed to the lever 184, the construction being such that when the lug 356 engages the wear plate 357, the platen roller is locked in its lowermost position. (Fig. 24.) The latch member 354 is urged yieldingly into its locking position by a spring 360 interposed between it and the carriage frame 117.

The latch member 354 comprises a downwardly extending arm 361 engageable with a dog 362 pivoted on a bracket member 363, the bracket member 363 being secured by a screw 365 to the platen member 90. (Figs. 24, 25 and 27.) A spring 367 yieldingly urges the dog 362 in a counter-clockwise direction (Figs. 24 and 25). The spring 367 is best illustrated in Fig. 27. The dog 362 projects through an aperture 370 provided in one of the channel members 91, the construction being such that angular displacement of the dog 362 in a counter-clockwise direction (Figs. 24 and 25) is limited by an edge of the aperture 370.

When the platen roller 180 is in its lowermost position and is locked in that position by the latch member 354, movement of the carriage 116 towards its home position, (as indicated by the arrow 373 in Fig. 24) will cause the arm 361 to engage the dog 362 and the dog will displace the latch member 354 in a counter-clockwise direction (Fig. 24) around its pivot 353 and against the action of the spring 360. This displacement of the latch member 354 will release the platen roller 180 so that the operator may displace the handle 189 to displace the platen roller 180 from the position wherein it is shown in Fig. 24 to the position wherein it is shown in Fig. 25. When the carriage 116 moves into its home position, the arm 361 is displaced to the left of the dog 362 (Figs. 24 and 25) and the latch member 354 returns to the position wherein it is shown in Fig. 24. The platen roller remains in its uppermost position. Then when the carriage 116 is subsequently displaced to the right (Figs. 24 and 25) during the next duplicating stroke, the arm 361 simply displaces the dog 362 in a clockwise direction against the action of the spring 367 so that it rides over the dog. The dog returns immediately to the position wherein it is shown in Figs. 24 and 25.

When the carriage 116 is in its home position, that is to say at the end of the machine nearest the operator, and the platen roller 180 and the latch member 354 occupy the relative positions wherein they are illustrated in Fig. 25, downward movement of the platen roller 180 will cause the free end of the lever 184 to function as a cam on the latch member 354 so that it will be displaced angularly in a counter-clockwise direction (Fig. 25) against the action of the spring 360. However, so soon as the wear plate 357 passes beneath the forward edge of the lug 356, the spring 360 angularly displaces the latch member 354 and the lug 356 engages the wear plate 357 in the manner illustrated in Fig. 24 so that the platen roller is locked in its lowermost or duplicating position.

The latch member 354 and the levers 184 are constructed so that the platen roller 180 is compressed or deformed to some extent when it is locked in its lowermost position. The resiliency of the sponge rubber from which the platen roller is preferably made, insures that the gelatin of the duplicating band will not be injured by the platen roller. The resiliency of the sponge rubber also insures that the lever 184 and the wear plate 357 will move upwardly instantaneously whenever the levers 183 and 184 and the ribs 375 are proportioned so that the carriage frame 117 is sprung slightly or bent when the platen roller 180 is in its lowermost position. Therefore, when the lug 356 is disengaged from the wear plate 357, the frame 117 and its ribs 375 act upon the levers 183 and 184 to lift the platen roller a slight distance.

The latch member 354 is controlled manually by means comprising a rectangular dog 380, a shaft 381 and a finger piece or lever 382. The shaft is journaled in the carriage frame 117 and the lever 382 and the dog 380 are secured to the shaft. The dog 380 is secured to the shaft 381 in such manner that a short end 385 projects from one side of the shaft and a long end 386 projects from the other side of the shaft. The shaft 381 may be displaced through the medium of the lever 382 to bring the short end 385 of the dog 380 into the position wherein it is shown in Fig. 26, in which position the short end 385 engages a lug 387 formed on the latch member 354 and holds the latch member so long as desired in a position wherein it cannot engage the wear plate 357. When the latch member 354 is locked in its functionally inoperative position in this manner, the operator must hold the platen roller 180 in its lowermost position during the duplicating stroke and also during the stripping stroke, if it is so desired. If, at any time during the reciprocatory movements of the carriage 116 over the platen 90, the operator wishes to release the latch member 354, it is only necessary to displace the lever 382 angularly so that the long end 386 of the dog 380 will engage the lug 387 and angularly displace the latch member 354 in a counter-clockwise direction (Fig. 24). This long end 386 of the dog 380 is of such proportions that it will not lock itself beneath the lug 387 and therefore will permit the latch member 354 to be displaced by the spring 360 so soon as the operator releases the lever 382.

The duplicating apparatus is provided with an improved margin bar 230 (Figs. 15 to 19, inclusive). The improved margin bar comprises a plate 231 which is normally disposed in the positions wherein it is shown in Figs. 15 to 18, inclusive. Formed integral with the plate 231 at the ends thereof, are lugs 232 which are pivoted to the channel members 91 by pins 233. Lugs 234 provided at the forward edge of the plate 231, normally rest upon the channel members 91 and hold the margin bar in its functionally operative position, the construction being such that the margin bar may be swung in a counter-clockwise direction (Figs. 15 to 17, inclusive, and Fig. 19) into a functionally inoperative position. The plate 231 is provided with an opening, groove or notch 235 for a purpose hereinafter disclosed. Lugs 237, formed on opposite sides of the opening of the notch 235, are disposed a short distance back of the forward edge of the plate 231 and are adapted to serve as margin stops when sheets of paper are fed from the table 226 between the rollers 180 and 195 as illustrated in Fig. 17. During the downward movement of the roller 180, the rack bar 205 is displaced toward the left (Fig. 15) and the roller 195 is rotated in a counter-clockwise direction to have it co-operate with the platen roller 180 to feed the paper downwardly a sufficient distance so that its lower edge will not be withdrawn from the lugs or margin stops 237. In other words, the paper is fed downwardly a sufficient distance to take care of the bend or curve formed in it by the platen roller 180 when the platen roller brings the paper into contact with the duplicating band.

The means for advancing the duplicating band across the platen and drawing it taut thereon is illustrated in Figs. 5 to 9, inclusive. It will be noted that the hub 158, in which the pin 153 at the front end of the machine is journaled, has a spiral gear 250 which meshes with a spiral gear 251 pinned to a shaft 252. Alined with the shaft 252 is a shaft 253 to which a spiral gear 254 is pinned. The spiral gear 254 is adapted to mesh with a spiral gear 255 provided with a hub 256 which slidably journals a pin 153a which is preferably identical in construction with the pin 153 and is adapted to drive the rear spindle 32b.

The shaft 253 is connected to the shaft 252 by means comprising a sleeve 252a which is rigidly secured to the shaft 253 by a pin 252b. A pin 252c projects through the shaft 252 and rides in slots 252d formed in the sleeves 252a. Interposed between the ends of the shafts 252 and 253 and disposed within the sleeve 252a is a spring 252e which yieldingly urges the shaft 252 to the right (Fig. 5) so that the ends of the pin 252c will engage the right hand ends of the slots 252d.

The gear 250 has a cylindrical depression formed in it to accommodate the clutch member 260 provided with notches 261 in which rollers 262 are positioned. Springs 263 yieldingly urge the rollers 262 into positions wherein they will frictionally engage the clutch member 260 and the gear 250 in such manner that the gear 250 will be held against counter-clockwise rotation. (Fig. 5.) The clutch member 260 is held against rotation in either direction by pins 265 which project from a bracket 266 secured to and in the side frame member 50 by bolts 267. Rotatably journaled on the bracket 266 is a disc 269 from which pins 270 project into the notches 261. A lug 272 projecting from the disc 269 is engageable by an eccentric 273 fixed to a shaft 274 which projects from the side frame member 50 and is provided at its outer end with a small lever 275 whereby the operator may displace the shaft 274 angularly.

Associated with the gear 255 is a clutch member 260a and a disc 269a which are similar in construction to the clutch member 260 and the disc 269, respectively, and have similar functions. The clutch member 260a is provided with notches 261a which accommodate rollers 262a. Springs 263a yieldingly urge the rollers 262a into positions wherein they will engage the gear 255 and the clutch member 260a in such manner that the gear 255 will be held against rotation in a clockwise direction. (Fig. 5.) The gear 255 is connected to the pin 153a by a pin and slot connection (not shown) substantially identical with the pin and slot connection between the gear 250 and the pin 153. The disc 269a is provided with pins 270a which project into the notches 261a. A lug 272a, formed integral with the disc 269a, is engageable by a collar 280 pinned to the shaft 253. It will be noted that the shafts 253 and 252 are rotatably and slidably journaled in housing members 282 and 283, respectively, disposed within the side frame member 50. At its outer end, the shaft 252 is provided with a handle 284 whereby the operator may rotate the shaft.

In Figs. 5 to 9, inclusive, the mechanism for advancing the gelatin band across the platen is shown adjusted as follows: The gear 251 meshes with the gear 250, the gear 254 being disengaged from the gear 255. The eccentric 273 is adjusted so that the pins 270 do not engage the rollers 262. The lug 272a is engaged by the disc 280 to hold the disc 269a in a position wherein the pins 270a hold the rollers 262a in the larger ends of the notches 261a so that the gear 255 is free to rotate in a clockwise direction (Fig. 5). With the winding and rewinding mechanism in this condition, it is obvious that one may rotate the shaft 252 in a predetermined direction to have the gear 251 rotate the gear 250 in a clockwise direction (Fig. 5) so that the gelatin band will unwind from the rear spindle and be advanced to the front spindle. After the gelatin band has been advanced the desired distance, it may be drawn taut across the platen by reversing the direction of rotation of the shaft 252. When the direction of rotation of the shaft 252 is reversed, the gear 251 is displaced toward the rear through the action of the meshing teeth of the gears 251 and 250 and through the action of the rollers 262 which prevent the gear 250 from rotating in a counter-clockwise direction. This displacement of the gear 251 to the rear is accompanied, of course, by like displacement of the shafts 252 and 253 so that the gear 254 meshes with the gear 255, the spring 252e being adapted to compensate for relative longitudinal movement of the shafts 252 and 253 during the period of time the gear 254 is being brought into meshing engagement with the gear 255. The displacement of the shaft 253 to the rear will be accompanied by like displacement of the disc 280 so that the springs 263c may displace the rollers 262a and they, in turn, will displace the pins 270a and the disc 269a in a clockwise direction (Fig. 5) whereupon the rollers 262a will be free to prevent rotation of the gear 255 in a clockwise direction (Fig. 5). The gear 254 is provided with a hub 254a which is also adapted to engage the lug 272a and displace the disc 269a in a clockwise direction (Fig. 5) when the gear 254 is brought into meshing engagement with the gear 255.

If it is assumed that the gear 251 has been disengaged from the gear 250 and the gear 254 has been brought into mesh with the gear 255 in the manner described above, it will be readily understood that the shafts 252 and 253 may be rotated in a direction to rotate the gear 255 in a counter-clockwise direction. This will draw the gelatin band taut across the platen as the gear 250 is held against counter-clockwise rotation (Fig. 5) by the rollers 262. When the gelatin band has been drawn taut across the platen, one may discontinue rotating the shafts 252 and 253 whereupon the gelatin band will remain in its taut condition across the platen. This is due to the fact that the rollers 262a prevent clockwise rotation of the gear 255 and the rear spindle, and the rollers 262 prevent counter-clockwise rotation of the gear 250 and the front spindle (Fig. 5).

If one desires to rewind the gelatin band upon the rear spindle, the mechanism is first adjusted so that the gear 251 is disengaged from the gear 250 and the gear 254 is in mesh with the gear 255. The eccentric 273 is then rotated through an angle of approximately 180° to displace the lug 272 so that the disc 269 will cause the pins 270 to hold the rollers 262 in the larger ends of the notches 261. The gear 250 and the front spindle will then be free to rotate in a counter-clockwise direction. Then if the shafts 252 and 253 are rotated to rotate the gear 255 and the rear spindle in a counter-clockwise direction, the gelatin band will rewind on the rear spindle.

Gears 250 and 255, the clutch members 260 and 260a and the rollers 262 and 262a form overrunning clutches, these clutches being controlled by the pins 270 and 270a which are, in turn, controlled by the eccentric 273 and the disc 230, respectively.

After the duplicating band has been advanced to present a clean duplicating surface, an impression is made thereof with a master sheet in the usual manner. In the duplicating operation, a sheet of paper is fed between the rollers 180 and 195 each time the carriage 116 is at the forward end of the machine, the platen roller 180 being first brought into its uppermost position as illustrated in Fig. 15. When a sheet of paper has been inserted between the rollers 180 and 195, the handle member 169 is displaced in a clockwise direction (Fig. 15) and the paper is brought into contact with the forward end of the duplicating band as illustrated in Fig. 17. The carriage is then pushed toward the back end of the machine, during which operation the rollers 180 and 195 feed the paper to the duplicating band and bring it into contact with the impression thereon. During the return stroke, the operator may grasp the projecting end of the paper and assist the rollers 180 and 195 to strip it from the duplicating band. If the entire length of the paper is applied to the duplicating band, it may be stripped therefrom by grasping the forward edge thereof through the notch or opening 233 in the margin bar 230 and stripping the paper from the band while the carriage is at the back end of the machine.

As best shown in Figs. 9 and 10, rubber bumpers 185 are provided to make the machine as noiseless as possible during its operation. The rubber bumpers 185 are clamped to the upper surface of the flange 69 by clips 186. Angle irons 187, secured to the bent bar 112, engage the bumpers 185 each time the carriage 116 is returned to its forward position.

Means is provided for yieldingly holding the carriage in its forward position. This means comprises a roller 290 journaled on a pin 291 which projects downwardly from the bent bar 112 (Figs. 9, 22 and 23). The roller 290 is engageable with rollers 293 and 294 carried by a lever 295 which is pivoted by a pin 296 to a bracket 297. The bracket 297 is secured to the flange 69 by screws 298. A spring 300 has one end secured to a pin 301 projecting from the lever 295. The other end of the spring 300 is secured to a bolt 302 adjustably mounted in a slot 303 formed in the bracket 297. A pin 305 projecting from the bracket 297 functions as a stop when the lever 295 is displaced from the position wherein it is shown in full lines (Fig. 22) to the position wherein it is shown in dotted lines. When the carriage 116 is in its forward position, the lever 295 is in a position wherein it is shown in full lines in Fig. 22 and the spring 300 urges the roller 294 against the roller 290 so that the carriage is held yieldingly in its forward position. When the operator displaces the carriage 116 toward the back end of the machine, the roller 290 displaces the roller 294 and the lever 295 to the positions wherein they are shown in dotted lines in Fig. 22 and the spring 300 yieldingly holds the lever 295 against the pin 305. When the carriage is returned to its forward position, the roller 293 engages the roller 290 and angularly displaces it and the lever 295 in a clockwise direction (Fig. 22). Then when the spring 300 swings past the pivotal axis of the lever 295, it snaps the lever 295 into the position wherein it is shown in full lines in Fig. 22 so that the roller 294 engages the roller 290. The action of the spring 300 may be varied by shifting the bolt 302 in the slot 303.

Improved means is provided for moistening the duplicating band, which means preferably comprises a roller 310 carried by a shaft 311 (Figs. 4, 20 and 21). Screws 312 screw-threaded into the ends of the shaft 311 have their heads slidably and rotatably journaled in slots 313 formed in bracket members 314, the bracket members 314 being mounted in a tray 315 which holds a supply of water. A yoke 316 is pivoted on the ends of the shaft 311 and is provided with pins 317 which are slidably journaled in notches 318 formed in the brackets 314. A lever 320 pivoted at one end of the shaft 311 is provided with notches 321 and 322 which are engageable with a lug 323 projecting from one of the bracket members 314. When the roller 310 is in the position wherein it is illustrated in Figs. 4 and 20, it will engage the duplicating band and be rotated thereby so that it will moisten the band with water it carries up from the tray 315. When the roller 310 is in its functional operative position, the notch 321 engages the lug 323. If it is desired to withdraw the roller 310 from its functional operative position, the operator raises the lever 320 to disengage the notch 321 from the lug 323 and then pushes the roller back into the position wherein it is illustrated in Fig. 21, in which position the notch 320 engages the lug 323. During this displacement of the roller 310, the yoke 316, aided by the pins 317 in the slots 318, holds the ends of the shaft 311 in alinement so that the screws 312 will not bind in the slots 313.

It will be noted that the shaft 195 and the levers 193 and 194 form a pivoted yoke for supporting the platen roller.

Figs. 29 to 31, inclusive, illustrate mechanism which may be employed in place of the mechanism illustrated in Figs. 22 and 23 to cooperate with the roller 290 in its task of yieldingly holding the carriage 116 in its forward position. The mechanism shown in Figs. 29 to 31, inclusive, comprises rollers 293a and 294a carried by a lever 295a which is pivoted by a pin 296a to a bracket 297a. The bracket 297a is secured to the flange 69 by screws 298a. A spring 300a has one end secured to a pin 301a projecting from the lever 295a. The other end of the spring 300a is secured to a pin 302a projecting from one end of a lever 302b which is pivoted intermediate its ends on a pin 302c. The pin 302c is carried by the bracket 297a. The other end of the lever 302b is engaged by one end of a screw 302d which is screw-threaded through a block 302e secured to the bracket 297a (see Fig. 30). The screw 302d is provided with a knurled head 302f whereby it may be rotated in either direction to adjust the tension of the spring 300a. Obviously, the rollers 293a and 294a, the lever 295a and the spring 300a cooperate with the roller 290 in the same manner as the rollers 293 and 294, the lever 295 and the spring 300, respectively, cooperate with the roller 290 to hold the carriage 116 yieldingly in its forward position. Substantially the only difference between the construction shown in Figs. 22 and 23 and the construction shown in Figs. 29 to 31, inclusive, is the provision of the screw 302d and the lever 302b whereby the tension of the spring 300a may be adjusted quickly and easily.

While we have shown and described certain embodiments of our invention, it is to be understood that it is capable of many modifications. Changes, therefore in the construction and arrangement may be made without departing from the spirit and scope of the invention as disclosed in the appended claims, in which it is our intention to claim all novelty inherent in our invention as broadly as possible, in view of the prior art.

We claim:

1. In a machine of the character described, a platen, trackways extending along the sides of the platen, a carriage member mounted on said trackways for movement longitudinally of said platen, a second carriage member extending transversely of said platen, means at the ends of said second carriage member for detachably securing it to the first mentioned carriage member, and a platen roller mounted in said second carriage member.

2. In a machine of the character described, a platen, trackways extending along the sides of said platen, a carriage member mounted on said trackways for movement longitudinally of said platen, a second carriage member disposed transversely of said platen, spring pressed dogs at the ends of said second carriage member for detachably securing it to the first mentioned carriage member, and a platen roller mounted in said second carriage member.

3. In a machine of the character described, a frame, a platen, a carriage movable over said platen, means pivotally mounted in said frame and engageable by said carriage for holding it in a predetermined position relative to said platen, a spring controlling said pivotally mounted means, and an impression member mounted in said carriage.

4. In a machine of the character described, a frame, a platen mounted in said frame, a carriage movable over said platen, an impression member mounted in said carriage, a lever pivoted on said frame, means on said carriage for displacing said lever, and a spring controlling said lever to hold it in a position wherein it retains said carriage in a predetermined position relative to said platen.

5. In a machine of the character described, the combination with a frame, a platen mounted in said frame, a carriage movable longitudinally of said platen, and a platen roller mounted in said carriage, of means for yieldingly holding said carriage in a predetermined position with respect to said platen, said means comprising a lever pivoted on said frame, anti-friction rollers carried by said lever, means on said carriage engageable with said rollers to displace said lever, and a spring controlling said lever.

6. In a machine of the character described, a platen, a carriage movable over said platen, a yoke pivoted in said carriage, a platen roll journaled in said yoke, a pressure roll mounted in said carriage and co-operating with said platen roll, a pinion constrained to rotate with said pressure roll, a rack bar pivoted to said yoke and having teeth engageable with the teeth of said pinion, and means for oscillating said yoke to raise and lower said platen roll.

7. In a machine of the character described, a platen, a gelatin band for said platen, and an impression roll for pressing sheets of paper against said gelatin band, said roll being more yielding than said gelatin.

8. In a machine of the character described, a platen, a gelatin band for said platen, and an impression roll of sponge rubber for pressing sheets of paper against said gelatin band.

9. In a machine of the character described, a platen having impression forming means thereon, and a platen roller formed of sponge rubber for pressing sheets of paper against said impression means.

10. In a machine of the character described, a platen, a gelatin band for said platen, a platen roller formed of sponge rubber, means for bringing said platen roller into and out of its functionally operative position with respect to said gelatin band, and means for locking said platen roller in its functionally operative position.

11. In a machine of the character described, a platen, a gelatin band for said platen, a platen roller formed of sponge rubber and movable into a functionally operative position wherein it is subjected to sufficient pressure to deform it, and means for locking said platen roller in its functionally operative position.

12. In a machine of the character described, a platen, a carriage mounted to be reciprocated over the platen, a yoke pivoted in said carriage, a platen roller journaled in said yoke, a pressure roller journaled in said carriage, a pinion constrained to rotate with said pressure roller, and a rack bar pivoted to said yoke and meshing with said pinion.

13. In a machine of the character described, a platen, a carriage mounted to be reciprocated over the platen, a yoke pivoted in said carriage, a platen roller journaled in said yoke, a pressure roller journaled in said carriage, a pinion constrained to rotate with said pressure roller, a rack bar pivoted to said yoke and meshing with said pinion, and yielding means for holding said rack bar in meshing engagement with said pinion.

14. In a machine of the character described, a platen, a carriage mounted to be reciprocated over said platen, a yoke pivoted in said carriage, a handle member for displacing said yoke, a platen roller journaled in said yoke, a pressure roller journaled in said carriage, a pinion constrained to rotate with said pressure roller, a rack bar pivoted to said yoke, yielding means for holding said rack bar in meshing engagement with said pinion, and means on said rack bar engageable by said yieldable means for yieldingly holding said yoke in a position wherein said platen roller is in a functionally inoperative position.

15. In a machine of the character described, a platen, a carriage frame mounted to be reciprocated over said platen, a yoke pivoted in said carriage frame, a platen roller journaled in said yoke, said yoke abutting against a portion of said frame to spring it slightly when said platen roller is in its functionally operative position with respect to said platen, means for locking said yoke in a position wherein said platen roller is in said functionally operative position, and means for releasing said yoke.

16. In a machine of the character described, a platen, a carriage mounted to be reciprocated over said platen, a yoke pivoted in said carriage, a platen roller journaled in said yoke, a latch member for locking said yoke in a position wherein said platen roller is in its functionally operative position with respect to said platen, a dog pivotally mounted in said carriage, and means for displacing said dog in one direction to secure said latch member in its functionally inoperative position and for displacing said dog in the opposite direction to disengage said latch member from said yoke.

17. In a machine of the character described provided with a gelatin band, means for moistening the gelatin band comprising a tray for holding a supply of water, spaced plates having alined slots therein, a yoke, a roller engageable with said gelatin band when it is in its functionally operative position, means for slidably and rotatably journaling said roller and said yoke in a pair of said slots, pins projecting from said yoke and slidably engaging a second pair of slots in said plates, and a lever for shifting said roller and said yoke from the functionally operative position of the roller to the functionally inoperative position thereof and vice versa.

18. In a machine of the character described provided with a gelatin band, means for moistening the gelatin band comprising a tray for holding a supply of water, spaced plates having alined slots therein, a yoke, a roller engageable with said gelatin band when it is in its functionally operative position, means for slidably and rotatably journaling said roller and said yoke in a pair of said slots, pins projecting from said yoke and slidably engaging a second pair of slots in said plates, a lever for shifting said roller and said yoke from the functionally operative position of the roller to the functionally inoperative position thereof and vice versa, and means for locking said roller in its functionally operative and inoperative positions.

19. In a machine of the character described, a platen, a carriage movable over said platen, a yoke pivoted in said carriage, a platen roll journaled in said yoke, a pressure roll mounted in said carriage and co-operating with said platen roll, a pinion constrained to rotate with one of said rolls, a rack bar pivoted to said yoke and having teeth engageable with the teeth of said pinion, and means for oscillating said yoke to raise and lower said platen roll.

20. In a machine of the character described, a frame, a platen in said frame, a carriage mounted to be reciprocated over said platen, a yoke pivoted in said carriage, a platen roller journaled in said yoke, means for locking said yoke in a position wherein said platen roller is in its functionally operative position, and a dog pivoted in said frame for actuating said means to unlock said yoke.

21. In a machine of the character described, a platen, trackways extending along the sides of the platen, a carriage member mounted on said trackways for movement longitudinally of said platen, a second carriage member, the first-mentioned carriage member and said second carriage member extending transversely of said platen and one of said carriage members being disposed below the platen and the other of said carriage members being disposed above the platen, means at the ends of one of said carriage members for detachably securing it to the ends of the other carriage member, and a platen roller mounted in said second carriage member.

22. In a machine of the character described, a platen, trackways extending along the sides of the platen, a carriage member mounted on said trackways for movement longitudinally of said platen, a second carriage member, the first-mentioned carriage member and said second carriage member extending transversely of said platen and one of said carriage members being disposed below the platen and the other of said carriage members being disposed above the platen, spring pressed dogs at the ends of one of said carriage members for detachably securing it to the ends of the other carriage member, and a platen roller mounted in said second carriage member.

23. In a machine of the character described, a frame, a platen mounted in said frame, a carriage movable over said platen, a yoke pivotally mounted in said carriage, a handle for displacing said yoke relative to said carriage, a platen roller carried by said yoke, means pivotally mounted in said frame and engageable by said carriage for holding it in a predetermined position relative to said platen, and a spring controlling said pivotally mounted means independently of said handle.

24. In a machine of the character described, a platen, a duplicating band on said platen, a carriage movable over said platen, a platen roller formed of sponge rubber and movably mounted in said carriage, and means for raising and lowering said roller in said carriage.

25. In a machine of the character described, a platen, a carriage movable over said platen, a platen roll, a member movably mounted in the carriage and journaling said platen roll, a pressure roll mounted in said carriage and co-operating with said platen roll, a pinion constrained to rotate with said pressure roll, a rack bar operatively connected to said movably mounted member which journals the platen roll, and means for displacing said movably mounted member to raise and lower said platen roll and to rotate said pressure roll.

26. In a machine of the character described, a frame, a platen mounted in the frame, a carriage reciprocable over said platen, a yoke pivoted in said carriage, a platen roller journaled in said yoke, a latch member for locking said yoke in a position wherein said platen roller is in its functionally operative position with respect to said platen, means mounted on said frame for displacing said latch member to release said platen roller from its functionally operative position, and means carried by the carriage for locking said latch member in a functionally inoperative position.

27. In a machine of the character described, a frame, a platen mounted in the frame, a carriage reciprocable over said platen, a yoke pivoted in said carriage, a platen roller journaled in said yoke, a latch member for locking said yoke in a position wherein said platen roller is in its functionally operative position with respect to said platen, means pivoted on said frame for displacing said latch member to release said platen roller from its functionally operative position, a spring yieldingly holding said pivoted means in its functionally operative position, and means carried by the carriage for locking said latch member in a functionally inoperative position.

28. In a duplicating machine, a platen having data to be duplicated thereon, a platen roller of sponge rubber for pressing copy sheets against said data, and means for locking said platen roller in a position with respect to said platen wherein it is deformed and remains so while it presses said copy sheets against said data.

ALFRED MARCHEV.
JOHN W. HERNLUND.